United States Patent
Vangala

(10) Patent No.: US 10,797,971 B2
(45) Date of Patent: *Oct. 6, 2020

(54) DIAGNOSTIC FRAMEWORK IN COMPUTING SYSTEMS

(71) Applicant: Microsoft Technology Licensing, LLC, Redmond, WA (US)

(72) Inventor: Vipindeep Vangala, Hyderabad (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 130 days.

This patent is subject to a terminal disclaimer.

(21) Appl. No.: 16/104,320

(22) Filed: Aug. 17, 2018

(65) Prior Publication Data

US 2019/0058642 A1 Feb. 21, 2019

Related U.S. Application Data

(63) Continuation of application No. 14/829,860, filed on Aug. 19, 2015, now Pat. No. 10,057,142.

(51) Int. Cl.
*H04L 12/26* (2006.01)
*G06F 11/07* (2006.01)
*G06F 11/34* (2006.01)

(52) U.S. Cl.
CPC .......... *H04L 43/028* (2013.01); *G06F 11/079* (2013.01); *G06F 11/3452* (2013.01); *G06F 11/3476* (2013.01); *G06F 2201/86* (2013.01)

(58) Field of Classification Search
CPC .............. G06F 11/079; G06F 11/3452; G06F 11/3476; G06F 2201/86; H04L 43/028
See application file for complete search history.

(56) References Cited

U.S. PATENT DOCUMENTS

| 8,032,866 B1* | 10/2011 | Golender .............. G06F 11/366 717/128 |
| 2013/0179863 A1* | 7/2013 | Vangala .................... G06F 8/74 717/124 |
| 2015/0269050 A1* | 9/2015 | Filimonov .......... G06F 11/3409 702/183 |

OTHER PUBLICATIONS

"Office Action Issued in European Patent Application No. 16751108. 8", dated Nov. 21, 2019, 8 Pages.

* cited by examiner

*Primary Examiner* — Davoud A Zand
(74) *Attorney, Agent, or Firm* — Liang IP, PLLC

(57) ABSTRACT

Various techniques for diagnostics, troubleshooting, and root-cause analysis are disclosed herein. In one embodiment, a method includes receiving operational data from a computing system and identifying an operational pattern based on the operational data. The operational pattern includes a temporal sequence of operations, events, or system states related to the computing system. The method also includes receiving an annotation and associating the received annotation with the identified operational pattern. The annotation identifies a reason, a cause, or a corrective suggestion corresponding to a violation of the temporal sequence.

20 Claims, 10 Drawing Sheets

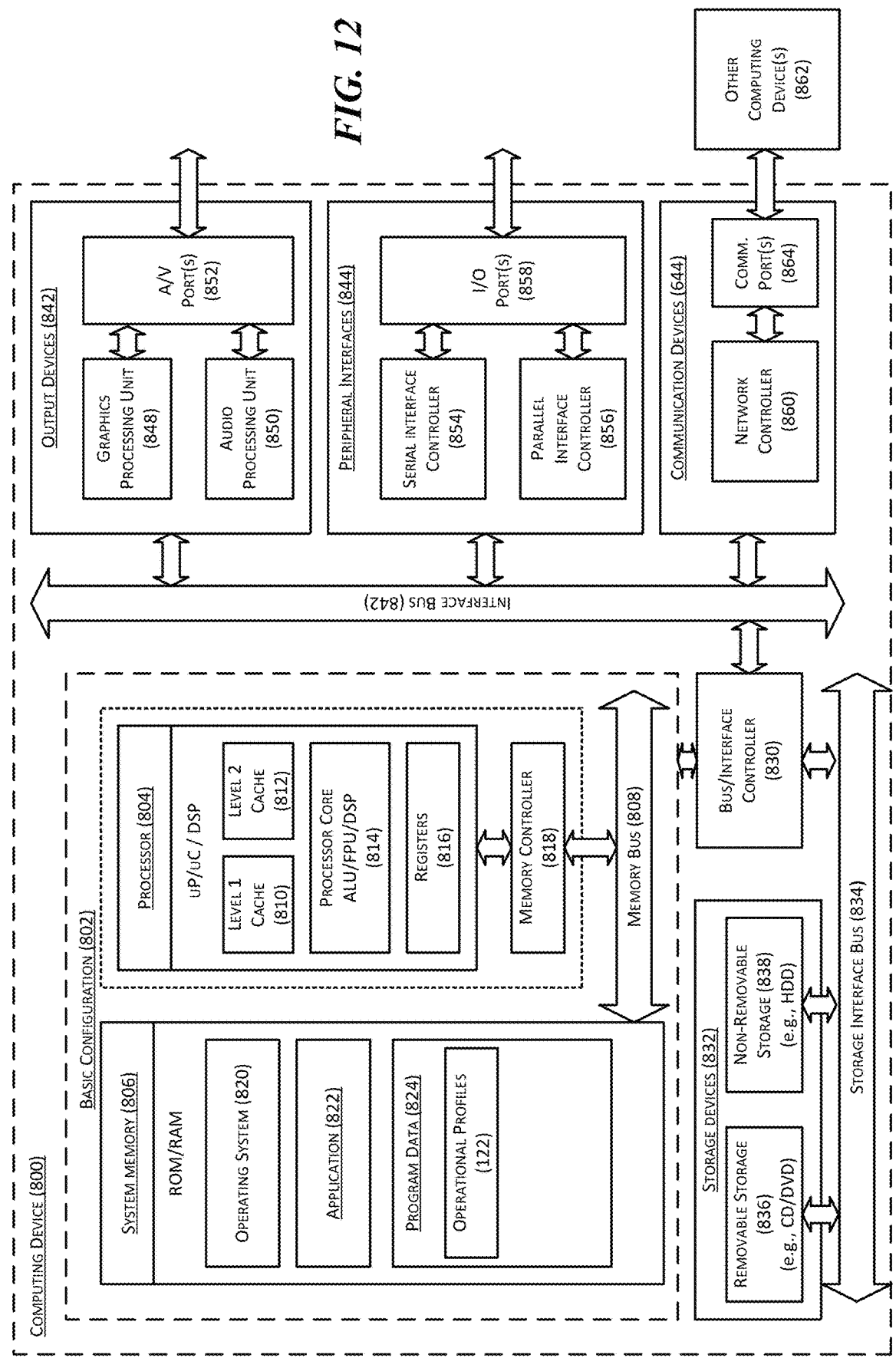

DIAGNOSTIC FRAMEWORK IN COMPUTING SYSTEMS

CROSS-REFERENCE TO RELATED APPLICATION(S)

This application is a continuation of and claims priority to U.S. patent application Ser. No. 14/829,860, filed on Aug. 19, 2015.

BACKGROUND

Cloud computing typically utilizes a group of virtual machines or other remote servers to process, manage, or store user data. A communications network can interconnect the remote servers to form a computing fabric. During operation, one or more remote servers of the computing fabric can cooperate with one another to provide a distributed computing environment that facilitates execution of various user software applications and provide other computing services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In certain cloud computing environments, a cloud service provider can provide computing facilities (e.g., tenant sites) to multiple users or tenants to execute user software applications. One difficulty of this arrangement is that the cloud service provider typically has no access to operating parameters, event logs, performance metrics, or other operational data of the individual tenant sites. Thus, the cloud service provider may not have sufficient information to diagnose, troubleshoot, or perform root-cause analysis of operational issues when tenants experience service outage, performance degradation, or other operational issues.

Several embodiments of the disclosed technology provide a diagnostic system and framework that enables tenants or a cloud service provider to efficiently diagnose, troubleshoot, or perform root-cause analysis of operational issues of a tenant site or the computing fabric supporting the tenant site. In certain embodiments, the diagnostic system can include an analysis component, an augmentation component, and an interpretation component operatively coupled to one another. The analysis component can be configured to examine historical and/or real-time operational data of a tenant site or at least a portion of a computing fabric. Through examination, the diagnostic system can recognize operational patterns (e.g., sequences of states or events) or correlate certain performance metrics (e.g., cache data size, network traffic volume, etc.) under normal operating conditions. The augmentation component can be configured to receive annotations from, for example, developers or administrators of the computing fabric or tenant site. The annotations can include possible reasons, causes, or predictions that resulted in a violation of an operational pattern or correlation of performance metrics under normal operating conditions. The annotated operational patterns and/or correlations of performance metrics can then form operational profiles.

The interpretation component can be configured to utilize the operational profiles to determine if any of the operational patterns or correlations of performance metrics are violated during operation. In response to determining that one of the operational patterns or one of the correlations of performance metrics is violated, the interpretation component can be configured to determine a reason, a possible cause, or a prediction associated with the violation based on the annotations in the operational profiles. The interpretation component can also correlate periods of violations with periods of operational issues experienced by a tenant. As such, the diagnostic system can efficiently and automatically identify possible reasons, causes, or predictions corresponding to operational issues experienced by tenants. In other embodiments, the interpretation component can also be configured to provide mitigation suggestions, automatic operational adjustments, and/or perform other suitable operations based on the identified possible reasons, causes, or predictions.

BRIEF DESCRIPTION OF THE DRAWINGS

FIG. 12 is a computing device suitable for certain components of the computing framework in FIG. 1.

DETAILED DESCRIPTION

Figure 1:
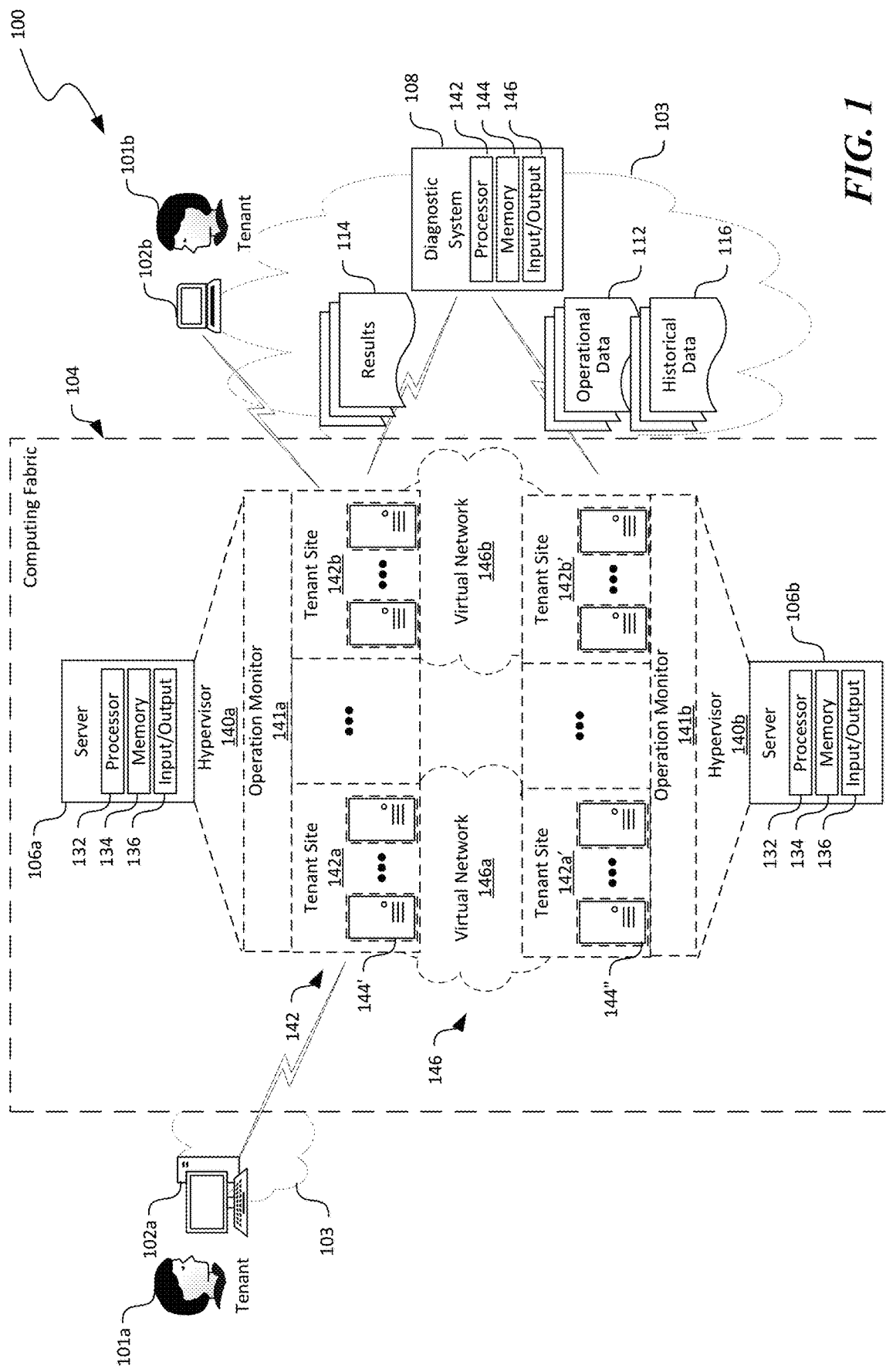
FIG. 1 is a schematic diagram illustrating a computing framework having a diagnostic system configured in accordance with embodiments of the disclosed technology.

Certain embodiments of systems, devices, components, modules, routines, and processes for diagnostics, troubleshooting, or root-cause analysis in computing systems are described below. In the following description, specific details of components are included to provide a thorough understanding of certain embodiments of the disclosed technology. A person skilled in the relevant art will also understand that the disclosed technology may have additional embodiments or may be practiced without several of the details of the embodiments described below with reference to FIGS. 1-12.

As used herein, the term "computing fabric" generally refers to a computing system having a plurality of nodes interconnected by a communications network in a "weave" or other suitable configurations. A "node" in a computing fabric generally refers to a computing element. In certain embodiments, a computing element can include a physical server with one or more computing processors, memory devices, and/or peripherals. In other embodiments, a computer element can include a virtual machine or other suitable virtualized entities with virtualized processor, memory, and/or storage devices. A physical computer network and/or one or more virtual computer networks can interconnect nodes of a computing fabric.

Also used herein, the term "tenant site" generally refers to a distributed computing environment provided by a computing fabric that facilitates execution of various user software applications in order to provide computing services to a user or tenant. A tenant site can be hosted on one or more nodes of the computing fabric and may be movable among nodes of the computing fabric. In certain embodiments, a tenant site can include one or more virtual machines. In other embodiments, a tenant site can include virtual network controllers and/or other suitable components.

As used herein, the term "operational patterns" generally refers to a temporal sequence of operations observed at, for example, a tenant site. For example, one operational pattern can include a sequence of receiving a user query, searching a database based on the user query, and transmitting a response to the user query. Optionally, operational patterns can also include time intervals between each pair of the sequence of operations. In the foregoing example, the operational pattern can also include a first time interval (e.g., 20 milliseconds) between receiving the user query and searching the database and a second time interval (e.g., 1 second) between searching the database and transmitting the response.

Also used herein, the term "performance metrics" generally refers to one or more operating parameters each corresponding to a performance level of a computing system. Example performance metrics can include a size of available memory, a data cache size, a network utilization percentage, a number of service requests over a period of time, etc. A performance metric may be correlated with one or more other performance metrics. In certain embodiments, a correlation coefficient may be computed for a pair of performance metrics. The correlation coefficient can have values (e.g., −1 to 1) to indicate if a pair of performance metrics is correlated (e.g., with a value approximately 1) or not correlated (e.g., with a value approximately −1). In other embodiments, pairs of the performance metrics may be correlated in other suitable manners.

As used herein, "annotation" to an operational pattern or correlation of performance metrics generally refers to input received from, for example, developers or administrators of the computing fabric or a tenant site. In certain embodiments, an annotation can include possible reasons, causes, or predictions when a particular operational pattern or correlation of performance metrics is violated. In other embodiments, an annotation can also include suggested mitigation or correction actions for the violation. For instance, an annotation may be added to the operational pattern in the example above that a database server is offline if searching the database is not performed within a period subsequent to receiving the user query. Also used herein, the term "operational profile" generally refers to data records of operational patterns and/or correlations of performance metrics with corresponding annotations.

In certain cloud computing environments, a cloud service provider can provide tenants distributed computing facilities, or tenant sites to provide desired computing services. However, the cloud service provider typically has no access to event logs, performance metrics, or other operational data at the individual tenant sites because the tenants have control over the corresponding tenant sites. Thus, the cloud service provider may not have sufficient or any information to diagnose, troubleshoot, or perform root-cause analysis of operational issues when a tenant requests the cloud service provider's help for service outages or other operational issues. Several embodiments of the disclosed technology can provide a diagnostic system and framework that enables tenants or cloud service providers to efficiently diagnose, troubleshoot, or perform root-cause analysis of operational issues, as described in more detail below.

FIG. 1 is a schematic diagram illustrating a computing framework 100 having a diagnostic system configured in accordance with embodiments of the disclosed technology. As shown in FIG. 1, the computing framework 100 can include client devices 102 (identified individually as first and second client devices 102a and 102b, respectively), a computing fabric 104, and a diagnostic system 108 interconnected by a computer network 103. The computer network 103 can include the Internet, a local area network, a metropolitan area network, a wide area network, and/or other suitable types of network. Particular components of the computing framework 100 are illustrated in FIG. 1 for illustration purposes. In other embodiments, the computing framework 100 can also include additional and/or different computing, networking, or other suitable types of components.

The client devices 102 can each include a desktop, a laptop, a tablet, a smartphone, and/or other suitable types of computing device. For example, as shown in FIG. 1, the first client device 102a can include a desktop computer. The second client device 102b can include a laptop computer. In other embodiments, the client device 102 may also include other suitable hardware and/or software components. In any of the foregoing embodiments, the client devices 102 can facilitate users or tenants 101 (identified individually as first and second tenants 101a and 101b, respectively) to access corresponding tenant sites 142 provided by the computing fabric 104, as described in more detail below.

As shown in FIG. 1, the computing fabric 104 can include multiple servers 106 (identified individually as first and second servers 106a and 106b, respectively) each having a processor 132, a memory 134, and an input/output component 136 operatively coupled to one another. The processor 132 can include a microprocessor, a field-programmable gate array, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132. The input/output component 136 can be configured to accept input from and provide output to an operator and/or an automated software controller (not shown).

The first and second servers 106a and 106b can individually contain instructions in the memory 134 that when executed by the processors 132, cause the individual processors 132 to provide a hypervisor 140 (identified individually as first and second hypervisors 140a and 140b) and an operation monitor 141 (identified individually as first and second operation monitors 141a and 141b). The hypervisors 140 and operation monitors 141 are shown in FIG. 1 as software components. However, in other embodiments, the hypervisors 140 and/or the operation monitors 141 can also include firmware and/or hardware components. Even though the hypervisor 140 and the operation monitor 141 are shown as separate components in FIG. 1, in other embodiments, the operation monitor 141 can be a part of the hypervisor 140 or an operating system (not shown) executing on the corresponding first or second server 106a and 106b.

The hypervisors 140 can individually be configured to generate, monitor, terminate, and/or otherwise manage one or more virtual machines 144 organized into tenant sites 142. For example, as shown in FIG. 1, the first server 106a can provide a first hypervisor 140a that manages first and second tenant sites 142a and 142b, respectively. The second server 106b can provide a second hypervisor 140b that manages first and second tenant sites 142a' and 142b', respectively. The tenant sites 142 can each include multiple virtual machines 144 associated with particular tenants 101. For example, the first server 106a and the second server 106b can both host the tenant site 142a and 142a' for the first tenant 101a, and the tenant site 142b and 142b' for the second tenant 101b. Each virtual machine 144 can be executing a corresponding operating system, middleware, and/or applications.

Also shown in FIG. 1, the computing fabric 104 can also include one or more virtual networks 146 that interconnect the tenant sites 142a and 142b across multiple hosts 106. For example, a first virtual network 142a interconnects the first tenant sites 142a and 142a' at the first and second servers 106a and 106b. A second virtual network 146b interconnects the second tenant sites 142b and 142b' at the first and second servers 106a and 106b. Even though a single virtual network 146 is shown as corresponding to one tenant site 142, in other embodiments, multiple virtual networks 146 (not shown) may be configured to correspond to a single tenant site 146.

The operation monitors 141 can be configured to monitor for operational data 112 of respective tenant sites 142 and/or the computing fabric 104. In certain embodiments, the operational data 112 can include operational patterns and/or performance metrics of the tenant sites 142 or the computing fabric 104. For example, the operational data 112 can include alarm logs, event logs, operating reports, and/or other suitable data from the tenant sites 142 and/or the computing fabric 104. In certain embodiments, the operation monitors 141, the hypervisors 140, or other suitable components of the servers 106 can also store previously acquired operational data 112 as historical data 116, for instance, in the memory 134 of the servers 106. The historical data 116 can then be provided to the diagnostic system 108 for offline analysis. In other embodiments, the operation monitors 141 can be configured to transmit the operational data 112 to the diagnostic system 108 for online analysis and/or monitoring. Based on the operational data 112 and/or the historical data 116, the diagnostic system 108 can be configured to generate operational profiles and monitor operations of the tenant sites 142 and/or the computing fabric 104, as described in more detail below.

As shown in FIG. 1, the diagnostic system 108 can include a processor 142, a memory 144, and an input/output component 146 operatively coupled to one another. The processor 142 can include a microprocessor, a field-programmable gate array, and/or other suitable logic devices. The memory 144 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 142 (e.g., instructions for performing the methods discussed below with reference to FIGS. 5-7). The input/output component 136 can include a display, a touch screen, a keyboard, a mouse, a printer, and/or other suitable types of input/output devices configured to accept input from and provide output to an operator and/or an automated software controller (not shown).

The diagnostic system 108 can be configured to perform analysis of the operational data 112 and/or historical data 116 on an offline or online basis. In one embodiment, the diagnostic system 108 can parse the operational data 112 and recognize operational patterns of the tenant sites 142 and/or the computing fabric 104. One example operational pattern is described in more detail with reference to FIG. 8. In another embodiment, the diagnostic system 108 can obtain performance metrics from the operational data 112 and compute correlation coefficients for the performance metrics. One example correlation of performance metrics is described in more detail with reference to FIG. 9. In further embodiments, the diagnostic system 108 can also be configured to perform a combination of the foregoing analysis and/or other suitable analysis.

The diagnostic system 108 can also be configured to receive annotations for one or more of the recognized operational patterns or correlations of performance metrics. An annotation can be associated with each operation in an operational pattern or a group of operations in an operational pattern. Similarly, an annotation can be associated with one or more correlations of performance metrics. One example of receiving annotations for an operational pattern is described in more detail with reference to FIG. 10. The operational patterns and correlations of performance metrics can then be stored with corresponding annotations as performance profiles in, for example, a database 110 (shown in FIG. 2).

The diagnostic system 108 can also be configured to monitor operations of the tenant sites 142 and/or the computing fabric 104 based on the generated performance profiles. For example, in certain embodiments, the diagnostic system 108 can receive and perform analysis on additional operational data 112 to recognize one or more additional operational patterns and/or correlations of performance metrics. The diagnostic system 108 can then compare the additional operational patterns and/or correlations of performance metrics with those in the performance profiles.

Based on the comparison, the diagnostic system 108 can also determine and/or quantify a health level of the tenant sites 142 or the computing fabric 104. For example, in one embodiment, a first quantity (e.g., 100) of user queries can be received in a period. If a second quantity (e.g., 99) of the received user queries are processed according to operational patterns that are generally similar to those in the performance profiles, the diagnostic system 108 can be configured to calculate a health level (e.g., 99%) based on the first and second quantities.

Upon determining a current health level, in certain embodiments, the diagnostic system 108 can be configured to raise an alarm or generate an event log if the current health level falls below a threshold. For example, the diagnostic system 108 can generate an email, text message, or other suitable messages reporting the violations and/or health level to an administrator. In other embodiments, the diagnostic system can also be configured to provide suggestions of corrective actions as results 114 for mitigating the violations or improving the health level based at least in part on the annotations associated with the operational patterns and/or correlations of performance metrics. For example, the results 114 can include a suggestion that a network bandwidth allocated to a tenant 101 be increased, more memory space be allocated to a particular virtual machine 144 or tenant site 142, and/or other suitable actions.

In further embodiments, the diagnostic system 108 can be configured to conduct a root-cause analysis based on reported operational issues and the observed violations. In one embodiment, the diagnostic system 108 can be configured to aggregate operational issues (e.g., request timeout, cache server unavailable, etc.) over a period to generate an operational issue timeline. The diagnostic system 108 can also be configured to aggregate the observed violations over the same period to generate a system issue timeline. The diagnostic system 108 can then align, juxtapose, or compare the generated operational issue timeline with the system issue timeline to correlate observed operational issues with violations. Upon identification of violations correlated to the operational issues, the diagnostic system 108 can be configured to determine a root-cause related to the observed operational issues and/or provide mitigation suggestions based on the annotations associated with the violations. One example of root-cause analysis is described in more detail below with reference to FIGS. 11A-11C.

In yet further embodiments, the diagnostic system 108 can also be configured to predict a deterioration, restoration, repetition, or other future conditions of operations of the tenant sites 142 and/or the computing fabric 104. For example, in one embodiment, the diagnostic system 108 can predict that a network or server failure is imminent based on a violation of an operational pattern or correlation of performance metrics. In another embodiment, the diagnostic system 108 may also predict that operation is likely to return to normal despite of the detected violation. In yet further embodiments, the diagnostic system 108 can be configured to automatically adjust operations of the tenant sites 142 and/or operations of the computing fabric 104. For example, the diagnostic system 108 can be configured to request a fabric controller (not shown) of the computing fabric 104 to allocate additional network bandwidth, memory space, or other resources to a particular tenant site 142.

In operation, the tenants 101 can individually access computing facilities at corresponding tenant sites 142 with the client devices 102 via the computer network 103. During operation, the operation monitors 141 or other suitable components of the computing fabric 104 can acquire and/or record operational data 112. The operational data 112 or any previously acquired historical data 116 can be provided to the diagnostic system 108 for analysis. In certain embodiments, the diagnostic system 108 can perform an offline analysis of the historical data 116 to generate performance profiles as described above. In other embodiments, the diagnostic system 108 can perform an online analysis of operational data 112 to generate the performance profiles. In further embodiments, the diagnostic system 108 can also perform additional online or offline analysis of the operational data 112 to update and/or otherwise modify the performance profiles on a continuous or periodical basis. The diagnostic system 108 can then perform operational monitoring of the tenant sites 142 and/or computing fabric 104 based on the generated performance profiles, as described above.

Even though the diagnostic system 108 is shown as being separate from the computing fabric 104 in FIG. 1, in other embodiments, the diagnostic system 108 can be a part of the computing fabric 104. For example, the diagnostic system 108 can be hosted on one or more of the servers 106 in the computing fabric 104. In further embodiments, the diagnostic system 108 can also be a part of the tenant sites 142 or the hypervisors 140. Further, the memory 144 of the diagnostic system 108 can contain instructions that when executed by the processor 142, cause the processor 142 to provide various software components for performing one or more of the foregoing functions of the diagnostic system 108. One example of such software components is described in more detail with reference to FIG. 2.

Figure 2:
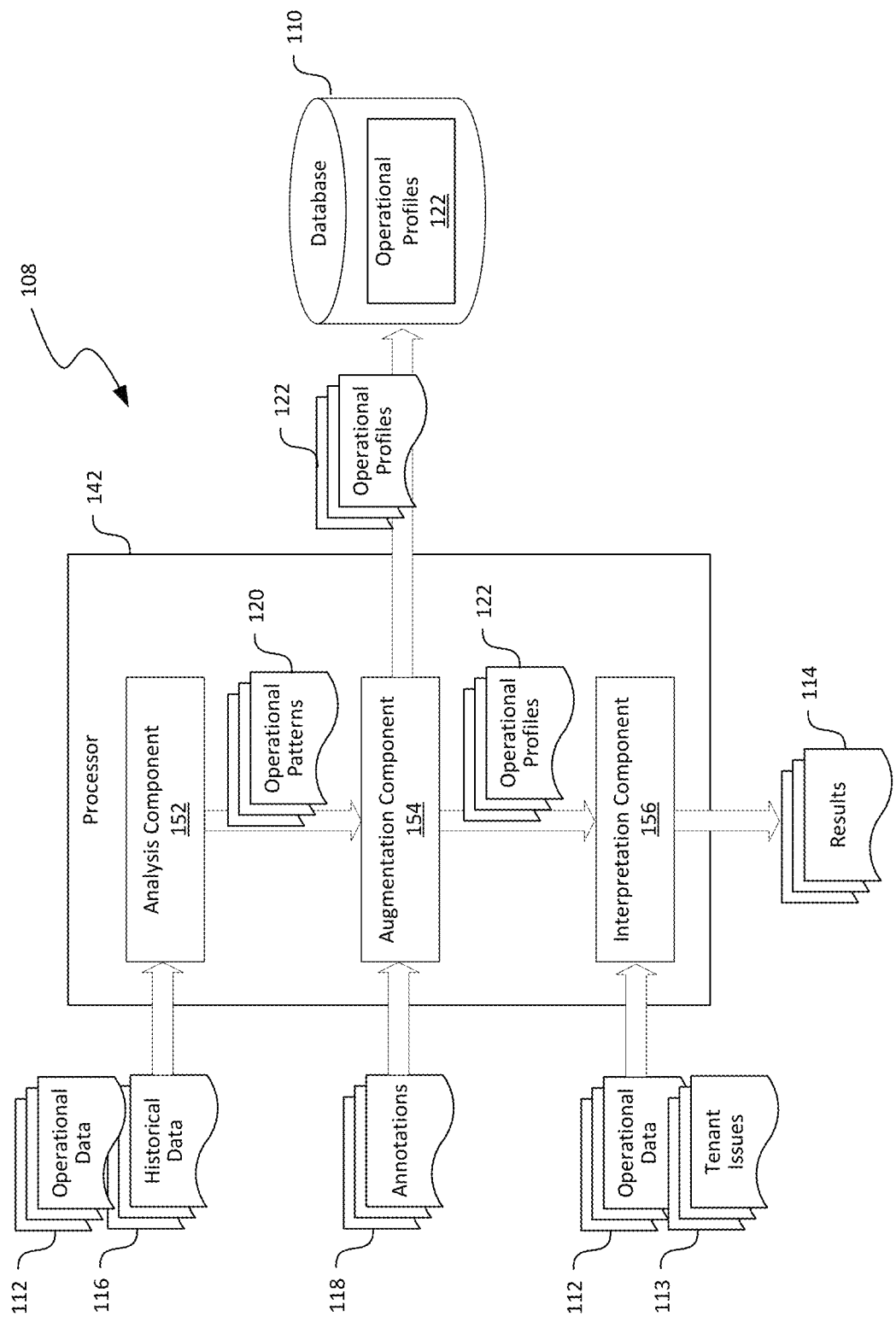
FIG. 2 is a block diagram showing software components suitable for the diagnostic system of FIG. 1 and in accordance with embodiments of the disclosed technology.

FIG. 2 is a block diagram showing software components suitable for the diagnostic system of FIG. 1 and in accordance with embodiments of the disclosed technology. In FIG. 2 and in other Figures herein, individual software components, objects, classes, modules, and routines may be a computer program, procedure, or process written as source code in C, C++, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the processor 142 of the diagnostic system 108 can include an analysis component 152, an augmentation component 154, and an interpretation component 156 operative coupled to one another. Even though particular components of the processor 142 are shown in FIG. 2, in other embodiments, the processor 142 can also include input/output, networking, communications, and/or other suitable types of components. In further embodiments, at least one of the analysis, augmentation, or the interpretation component 152, 154, and 156 can be provided by other processing components (e.g., virtual machines 144 in FIG. 1) than the processor 142 of the diagnostic system 108.

As shown in FIG. 2, the analysis, augmentation, or the interpretation component 152, 154, and 156 can also be operatively coupled to a database 110 containing records of operational profiles 122. In one embodiment, the database 110 can reside in the memory 144 (FIG. 1) of the diagnostic system 108. In other embodiments, the database 110 can be reside in a network storage server (not shown) and/or other suitable storage components of the computing fabric 104 (FIG. 1) or an external computing system.

As shown in FIG. 2, the analysis component 152 can be configured to receive and process the operational data 112 and/or the historical data 116 related to a tenant site 142 (FIG. 1) or at least a portion of a computing fabric 104. In certain embodiments, the analysis component 152 can be configured to recognize certain computing, network, or other suitable types of operations contained in the operational data 112 and/or the historical data 116 based on, for example, user input 117 (shown in FIG. 3) containing a list of operational types. Based on the recognized operations, the analysis component 152 can then determine one or more sequences of the operations as well as time intervals therebetween.

In other embodiments, the analysis component 152 can also be configured to recognize one or more performance metrics contained in the operational data 112 and/or the historical data 116. The analysis component 152 can then determine one or more correlation values between pairs of the performance metrics. Based on the correlation values, the analysis component 152 can indicate whether a first operational metric (e.g., an available memory size) is correlated or not correlated to a second operational metric (e.g., a cache data size). The analysis component 152 can then provide the determined one or more sequences of operations and the correlations of performance metrics as operational patterns 120 to the augmentation component 154 for further processing. One example of software modules suitable for the analysis component 152 is described in more detail below with reference to FIG. 3.

The augmentation component 154 can be configured to receive annotations 118 and associate the received annotations 118 to corresponding operations and/or correlations in the operational patterns 120. In one embodiment, the annotation 118 can include a possible reason that can cause a violation of a sequence of operations in the operational patterns 120. For example, the annotation 118 can identify that a network traffic is a cause for a delay in queuing a received user request. In another embodiment, the annotation 118 can also include a possible reason that can cause a violation of a recognized correlation of performance metrics in the operational patterns 120. For example, the annotation 118 can identify that a possible cause for a continuous decrease of available memory in light of a generally constant cache data size is memory leakage. In further embodiments, the annotation 118 can also include possible mitigation, remediation, or other suitable data associated with a violation of a sequence of operations or a correlation of performance metrics in the operational patterns 120. The augmentation component 154 can be configured to combine the operational patterns 120 with corresponding annotations 118 as the operational profiles 122 to be stored in the database 110 and/or provided to the interpretation component 156.

In certain embodiments, the interpretation component 156 can be configured to receive the operational data 112 in real-time and monitor operations of the tenant sites 142 or the computing fabric 104 on a real-time basis. In other embodiments, the interpretation component 156 can also be configured to receive historical data 116 and analyze for potential causes for operational issues. In further embodiments, the interpretation component 156 can be configured to analyze the operational data 112 and/or the historical data 116 in other suitable manners.

In any of the foregoing embodiments, the interpretation component 156 can be configured to determine one or more operational patterns from the operational data 112 and/or the historical data 116. The interpretation component 156 can then compare the determined operational patterns with corresponding ones in the operational profiles 122. In response to determining that an operational pattern is violated, the interpretation component 156 can be configured to look up associated annotations 118 to provide reasons, root-causes, and/or mitigation suggestions. In other embodiments, the interpretation component 156 can also be configured to calculate a health level of the tenant site 142 or the computing fabric 104 based on a number of detected violations of the operational patterns, a total number of operations, and/or other suitable parameters. The interpretation component 156 can also receive reported tenant issues 113 that include one or more operational issues experienced by a tenant 101 (FIG. 1). The interpretation component 156 can then aggregate the tenant issues 113 over a period and compare the aggregated tenant issues 113 with the detected violations of the operational patterns over the same period. The interpretation component 156 can the provide reasons, root-causes, and/or mitigation suggestions for the reported tenant issues 113. One example of software modules suitable for the interpretation component 156 is described in more detail below with reference to FIG. 4.

Figure 3:
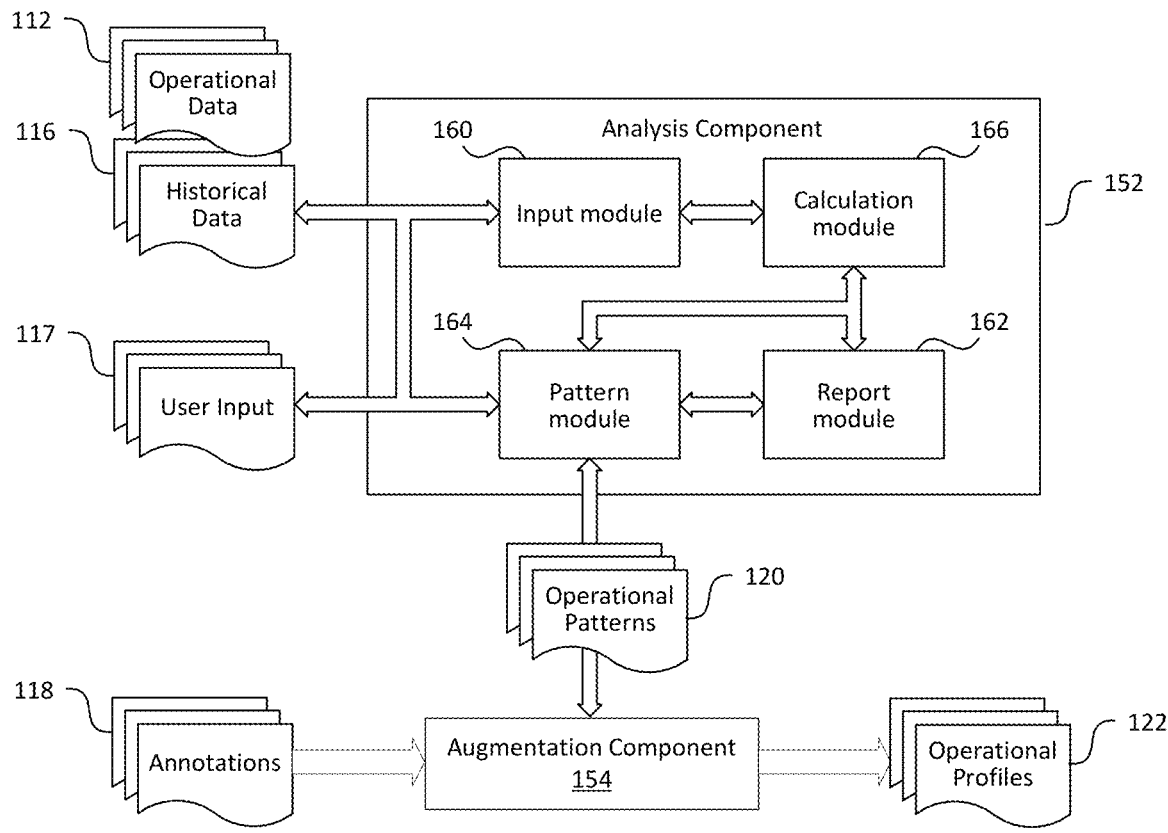
FIGS. 3 and 4 are block diagrams showing example software modules suitable for the analysis component and interpretation component of FIG. 2, respectively, in accordance with embodiments of the disclosed technology.

FIG. 3 is a block diagram showing example software modules suitable for the analysis component 152 of FIG. 2 in accordance with embodiments of the disclosed technology. As shown in FIG. 3, the analysis component 152 can include an input module 160, a calculation module 166, a report module 162, and a pattern module 164 operatively coupled to one another. Even though particular modules are shown in FIG. 3, in other embodiments, the analysis component 152 can also include output, network, or other suitable types of modules.

The input module 160 can be configured to receive the operational data 112, the historical data 116, and the user input 117. The input module 160 can also be configured to recognize one or more events, issues, exceptions, states, performance metrics, or other suitable operational conditions contained in the operational data 112 and/or the historical data 116. For example, in one embodiment, the input module 160 can generate the operational conditions based on a set of rules contained in the user input 117. The set of condition rules can include one or more keywords, strings, or combinations thereof. Example keywords or strings include, for instance, "caching service stopped," "failed to create cache instance," "network timeout," etc. One example condition rule related to cache operation event can be as follows:

```
<EventPattern>
    <Pattern>Failed to create cache instance</Pattern>
    <stateName>CacheInstanceIssue</stateName>
</EventPattern>
```

In the example above, a pattern for a failure to create a cache instance can be recognized when a state name "CacheInstanceIssue" is recognized in the operational data 112 and/or historical data 116. Based on the set of condition rules, the input module 160 can then scan the operational data 112 and/or the historical data 116 to generate a set of operational features with corresponding time stamps. In other embodiments, the foregoing functionalities can also be accomplished via machine learning, regular expressions, or other suitable techniques.

The input module 160 can also be configured recognize a transition of system health from, for example, a healthy state to an unhealthy state, or vice versa, based on a set of health rules. The set of health rules can include one or more health conditions. For instance, in one embodiment, the following health rule illustrates a health condition that includes an event of cache service is started:

```
<HealthRule>
    <HealthyStates>
        <string>CacheServiceStarted</string>
        <string>ThrottlingExited</string>
    </HealthyStates>
</HealthRule>
```

If this health condition is met, the input module 160 can be configured to recognize a transition of system healthy from an unhealthy state to a healthy state. In another example, the input module 160 can indicate a transition from a healthy state to unhealthy state when a healthy condition of CPU being under a full load is met.

The input module 160 can further be configured to map certain performance metrics to a system health state. For example, in one embodiment, the input module 160 can indicate a transition from a healthy state to an unhealthy state when an available memory size is less than a threshold (e.g., 50 MB); a number of memory page faults per second exceeds another threshold (e.g., 600 per second), etc. In other embodiments, the input module 160 can also map other performance metrics to other suitable system health states.

The calculation module 166 may include routines configured to perform certain types of calculations to facilitate operations of other modules. In one example, the calculation module 166 can include a counter that accumulates a number of operational conditions or transition of health states. In another example, the calculation module 166 can include an accumulation routine that calculates a duration of a persistent unhealthy state. In a further example, the calculation module 166 can be configured to compute a correlation coefficient between a pair of performance metrics. In further examples, the calculation module 166 can include linear regression, polynomial regression, interpolation, extrapolation, and/or other suitable subroutines.

The pattern module 164 can be configured to determine temporal sequences of operational conditions and/or correlations of performance metrics. In one embodiment, the pattern module 164 can recognize a sequence of events based on the processed operational data 112 and/or historical data 116 from the input module 160. One example routine ("TemporalRule") for determining the temporal sequences can be as follows:

```
<TemporalRule>
 <RuleEvents>
  <a:string>Put</a:string>
  <a:string>ReplicationQueued</a:string>
  <a:string>Pending</a:string>
  <a:string>ReplicationAcked</a:string>
 </RuleEvents>
 <TimeToNexEvent>
```

```
  <a:long>0</a:long>
  <a:long>5</a:long>
  <a:long>50</a:long>
  <a:long>100</a:long>
 </TimeToNexEvent>
 <ViolationClasses>
  <a:string>Connection$ NetworkBottlenecks </a:string>
  <a:string>ToomuchLoad$Contentions$GCIssues</a:string>
  <a:string>NetworkBottlenecks$WCFIssues</a:string>
  <a:string>PutIssues$ NetworkBottlenecks $Reconfiguration</a:string>
  </ ViolationClasses>
</TemporalRule>
```

The above example routine can be automatically derived from one or more successful stress, function, or performance runs of a tenant site 142 (FIG. 1) or the computing fabric 104 (FIG. 1). As shown above, the "RuleEvent" routine is configured to recognize a sequence of "Put," "Replication-Queued," "Pending," and "ReplicationAcked" events indicated in the operational data 112 and/or the historical data 116. The "TimeToNexEvent" routine is configured to determine a time interval between the foregoing events in, for example, milliseconds or seconds. The example above specifies that a time interval between "Put" to "Replication-Queued" should be no more than 5 milliseconds. The "ViolationClasses" routine is configured to define certain classes of violations when the foregoing recognized sequence is violated.

In another embodiment, the pattern module 164 can be configured to indicate a correlation of pairs of performance metrics based on, for example, the computed correlation coefficients from the calculation module 166. For instance, in one embodiment, the correlation module 162 can indicate that an available memory size is inversely correlated to a data cache size based on a correlation coefficient approximately −1. In another example, the pattern module 164 can indicate that a network utilization level is correlated with a number of service requests based on a correlation coefficient of approximately 1. One example routine for correlating performance metrics can be as follows:

```
<Correlations>
    <PerfCounter> Network Bandwidth Usage </PerfCounter>
    <PerfCounter> Cache Bandwidth Usage </PerfCounter>
    <PerfCounter> Average Secondary Response Time </PerfCounter>
    <CorrelationValue> 0.998 </CorrelationValue>
    <ViolationClasses>   NetworkBottleNecks$ExternalProcessUsage
    </ViolationClasses >
</Correlations>
```

As shown above, the example routine defines that the performance metrics "Network Bandwidth Usage," "Cache Bandwidth Usage," and "Average Secondary Response Time" should be correlated with a correlation coefficient values of 0.998 out of a range of (−1 to 1). If this correlation is violated, the violation is associated with a violation class "NetworkBottleNecks$ExternalProcessUsage."

The pattern module 164 can then combine the sequences of operational conditions and/or correlations of performance metrics into records of operational patterns 120 in an XML file, spreadsheet, or other suitable types of data file. The pattern module 164 can also be configured to provide the operational patterns 120 to the augmentation component 154.

The augmentation component 154 can then associate the annotations 118 with the operational patterns 120 to generate the operational profiles 122. In one embodiment, each health rule can be associated with annotations 118 representing a violation class suggesting what a reason for a violation of the rule. The reason can be specific to a user software application or generic to the distributed computing environment in the computing fabric 104. For example, cache operations can have failure reasons such as over eviction, put issues, memory cleanup issues, etc. Example generic reasons can include thrashing, system is paging, low RAM, network throttling, etc. The example sequence above can be associated with an annotation 118 as follows:

<a:string>ToomuchLoad$Contentions$GCIssues</a:string>

This foregoing annotation 118 indicates that if there is a violation of the example sequence above at "ReplicationQueued" (the second event in the temporal sequence), then one of the reasons is too much load, contention, or garbage collection issue ("GCIssues").

When a health rule is violated, a certain health state can be indicated with corresponding mitigation suggestions. For example, if a number of memory page faults exceeds a threshold, memory thrashing can be indicated, and a mitigation suggestion to avoid memory threshing is to increase memory allocation. In other embodiments, each violation class can be associated with a plurality of mitigation suggestions, which can be provided to a detected health state based on ranking of effectiveness, costs, or other suitable criteria. For example, each failure reason above can be associated with a corrective operation, which can include a description of what a user to do and/or an input to an automated system (e.g., a fabric controller associated with the computing fabric 104) that takes corrective actions (e.g., increasing network bandwidth limits, terminating unwanted applications, etc.).

The report module 162 can be configured to summarize issues found when analyzing the operational data 112 and/or the historical data 116. The report module 162 can aggregate recognized operating conditions based on, for example, server side issues, client side issues, or based on other suitable criteria. For example, the report module 162 can be configured to show issues detected during a particular period, such as, for instance, a percentage of request timeouts, serialization exceptions, replication queue full, etc. In other embodiments, the report module 162 can also provide a summary of the system health conditions in the same period. For example, the report module 162 can identify that crashes have been identified, network issues have been encountered, CPU is under full load for a period of time, etc. The report module 162 can also identify when system health transitions from healthy to unhealthy or vice versa. For example, the report module 162 can represent the system health as a state machine as follows:

High CPU usage from 10:10 to 10:15 PM; and

Partition movements happening from 10:13 to 10:20 PM.

Based on the output from the report module 162, an administrator or operator can discover potential performance issues without searching through a large of data of event logs.

Figure 4:
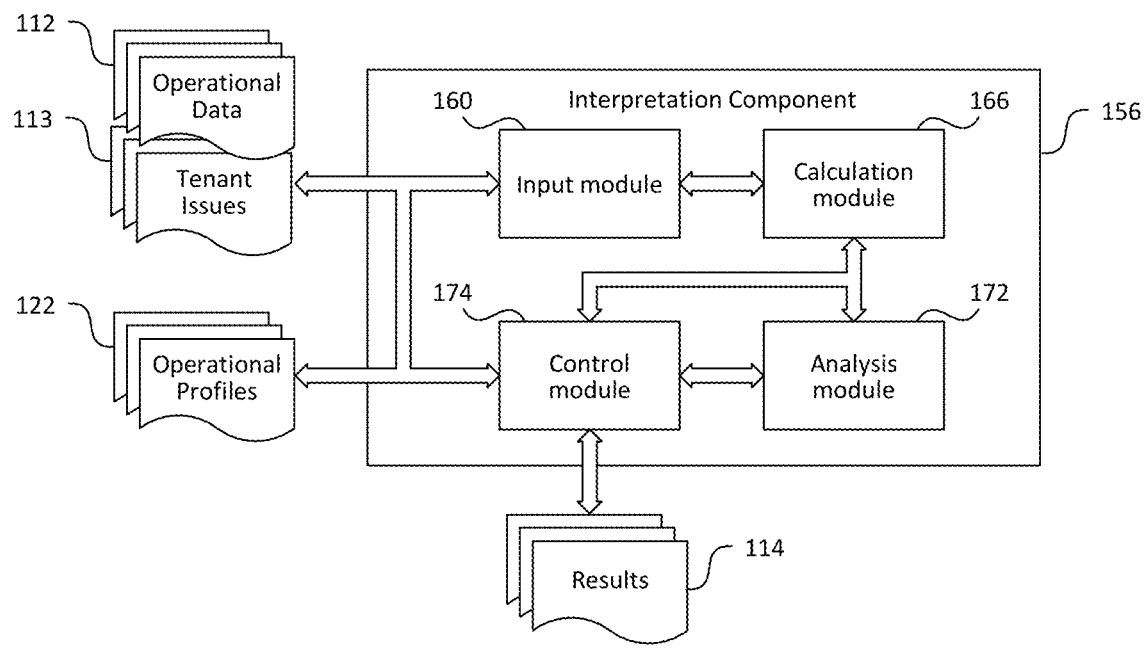

FIG. 4 is a block diagram showing example software modules suitable for the interpretation component 156 of FIG. 2 in accordance with embodiments of the disclosed technology. The interpretation component 156 can be configured as an offline or online system. For example, in certain embodiments, the interpretation component 156 can be configured as an offline system that receives and processes the operational data 112. In other embodiments, the interpretation component 156 can also be configured as an online system that is a part of a user software application or a separate service running parallel of the user software application.

As shown in FIG. 4, the interpretation component 156 can include certain modules that are generally similar in function and/or structure as those of the analysis component 152 in FIG. 3. As such, similar modules in FIG. 4 are identified with similar references. In certain embodiments, the interpretation component 156 can include an input module 160, a calculation module 166, an analysis module 172, and a control module 174 operatively coupled to one another. In other embodiments, the interpretation component 156 can also include other suitable modules and or routines.

In certain embodiments, the input module 160 and calculation module 166 can cooperate to determine one or more of operational patterns and/or correlations of performance metrics based on the received operational data 112. The analysis module 172 can be configured to compare the determined operational patterns and/or correlations of the performance metrics with corresponding ones in the operational profiles 122. The analysis module 172 can then determine if any violations of the operational patterns and/or correlations exist. Based on the determined violations (if any), the analysis module 172 can identify the reasons of such violations and providing guidance or suggestions of corrective measures based on the annotations 118 (FIG. 3) associated with the violations.

For instance, in the example sequence discussed above with reference to FIG. 3 of (i.e., Put, ReplicationQueued, Pending, and ReplicationCompleted) is violated because ReplicationCompleted is not seen. In addition, a violation of the correlation between network bandwidth usage, cache bandwidth usage, and average secondary response Time is also detected. Based on the foregoing violations, the analysis module 172 can determine that a reason for these violations is likely due to network bottlenecks. The analysis module 172 can then provide the results of analysis to the control module 174, which is configured to generate results 114 providing, for example, identification of the violations and any suggestions of corrective actions. For instance, in the foregoing example, the results 114 may suggest to decrease load or increase network capacity.

In other embodiments, the analysis module 172 can also be configured to aggregate tenant issues 113 (e.g., request timeout, cache server unavailable, etc.) over a period to generate an operational issue timeline. The analysis module 172 can also be configured to aggregate the observed violations over the same period to generate a system issue timeline. The analysis module 172 can then align, juxtapose, or compare the generated operational issue timeline with the system issue timeline to correlate observed operational issues with violations. Upon identification of violations correlated to the operational issues, the diagnostic system 108 can be configured to determine a root-cause related to the observed operational issues and/or provide mitigation suggestions based on the annotations associated with the violations.

Figure 5:
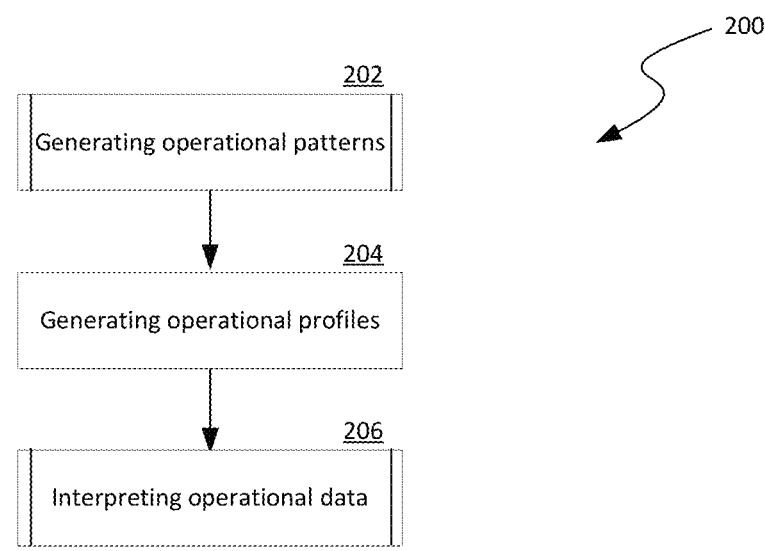
FIG. 5 is a flow diagram illustrating embodiments of a process of performing operational diagnostics in accordance with embodiments of the disclosed technology.

FIG. 5 is a flow diagram illustrating embodiments of a process 200 of performing operational diagnostics in accordance with embodiments of the disclosed technology. Even though the process 200 is described below with reference to the computing framework 100 of FIG. 1 and the software components of FIGS. 2-4, in other embodiments, the process 200 can be implemented in other suitable computing systems, devices, or frameworks.

As shown in FIG. 5, the process 200 can include generating operational patterns based on operational data 112 and/or historical data 116 (FIG. 1) at stage 202. In certain embodiments, the operational patterns can include temporal sequences of events. In other embodiments, the operational patterns can also include time intervals between successive events in the temporal sequences. In further embodiments, the operational patterns can also include correlations of two or more performance metrics of a computing system. Example operations for generating the operational patterns are described in more detail below with reference to FIG. 6.

As shown in FIG. 5, the process 200 can also include generating operational profiles at stage 204. The operating profiles can include the operations patterns generated from stage 202 and associated annotations received from a developer, an administrator, or other suitable entities. The process 200 can the include interpreting operational data based on the operational profiles at stage 206. Interpreting the operational data may be performed online or offline from a corresponding computing system. Example operations for interpreting the operational data are described in more detail below with reference to FIG. 7.

Figure 6:
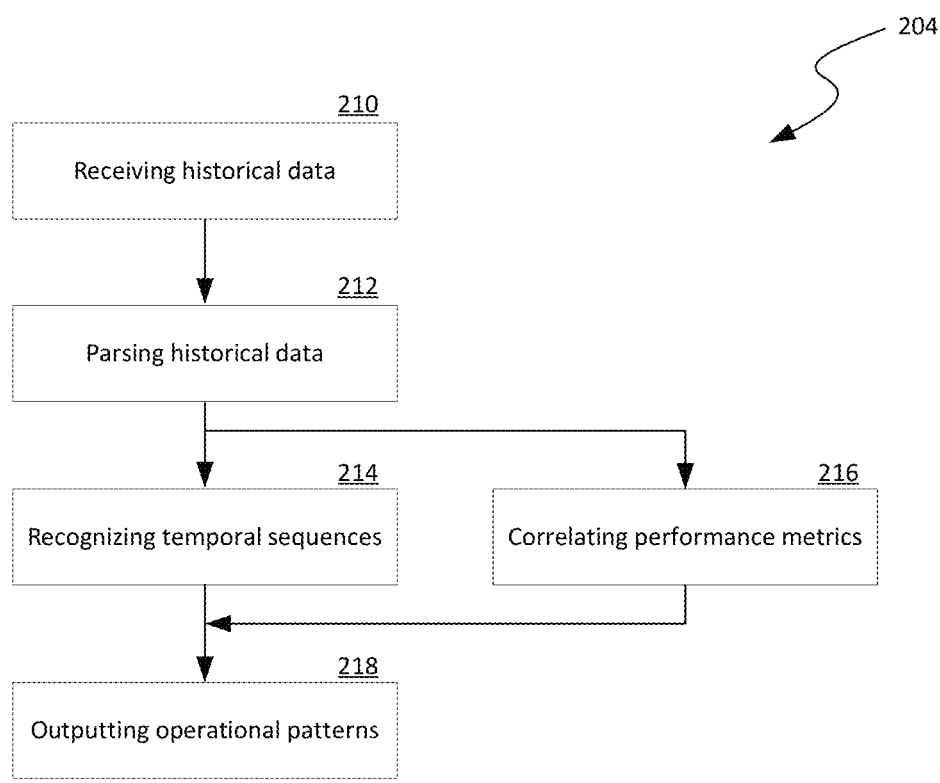
FIG. 6 is a flow diagram illustrating embodiments of a process of generating operational patterns in accordance with embodiments of the disclosed technology.

FIG. 6 is a flow diagram illustrating embodiments of a process 204 of generating operational patterns in accordance with embodiments of the disclosed technology. As shown in FIG. 6, the process 204 can include receiving historical data at stage 210. The process 204 can then include parsing the historical data at stage 212. Parsing the historical data can be performed by, for example, identifying events, conditions, performance metrics based on user-provided rules, as described above with reference to FIGS. 2 and 3. The process 204 can then include recognizing temporal sequences at stage 214 and correlating performance metrics at stage 216, as described above with reference to FIGS. 2 and 3. The process 204 can then include outputting the operational patterns at stage 218. The operational patterns can include the temporal sequences and/or correlations of performance metrics generated at stages 214 and 216, respectively.

Figure 7:
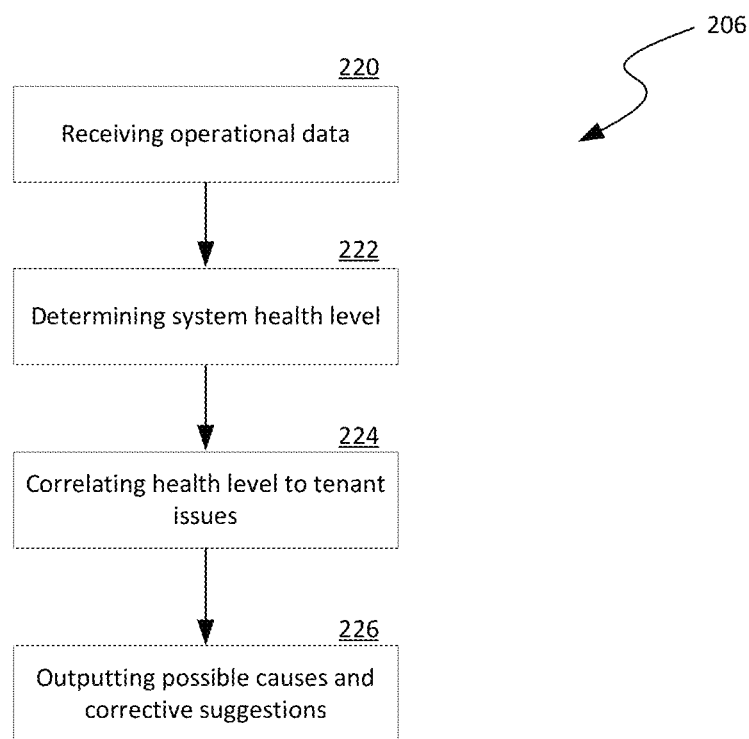
FIG. 7 is a flow diagram illustrating embodiments of a process of performing interpretation of operational data in accordance with embodiments of the disclosed technology.

FIG. 7 is a flow diagram illustrating embodiments of a process 206 of performing interpretation of operational data in accordance with embodiments of the disclosed technology. As shown in FIG. 7, the process 206 can include receiving operational data at stage 220. Receiving the operational data can be on an online or offline basis. The process 206 can then include determining a system health level at stage 222. In one embodiment, determining the system health level includes determining one or more violations of the operational patterns or correlations of performance metrics in the operational profiles. In other embodiments, determining the system health level can also include computing a rate of violation based on a number of operations with violations and a total number of operations in a period of time.

The process 206 can then include correlating the system health level with reported tenant issues at stage 224. In one embodiment, the system health level can be correlated with the tenant issues by comparing a timeline of the system health level with a timeline of the tenant issues. In other embodiments, the system health level can be correlated with the tenant issues by linear regression, manual comparison, and/or other suitable techniques. The process 206 can then include outputting possible causes and/or corrective suggestions for the tenant issues at stage 226. As described above with reference to FIGS. 1-4, the possible causes and/or corrective suggestions can be determined by looking up annotations corresponding to the detected violations.

Figure 8:
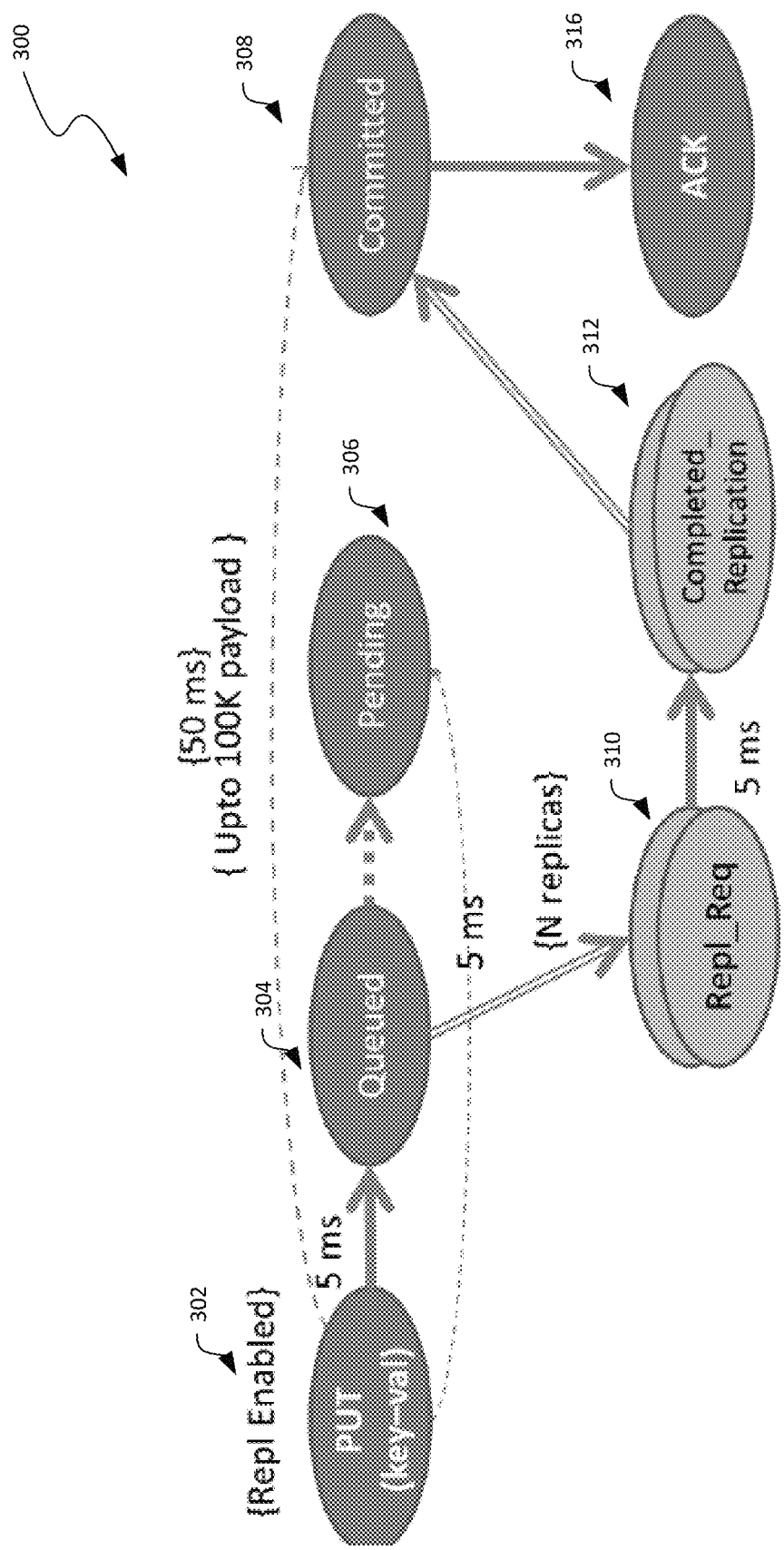
FIG. 8 is a schematic diagram illustrating an example operational pattern in accordance with embodiments of the disclosed technology.

FIG. 8 is a schematic diagram illustrating an example operational pattern 300 of a computing system under normal operation conditions in accordance with embodiments of the disclosed technology. As shown in FIG. 8, the operational pattern 300 can include one or more sequences of operations, events, or states. In the illustrated embodiment, the operational pattern 300 can include a first sequence having a Put operation 302, a Queued operation 304, and a Pending state 306. The operational pattern 300 can also include a second sequence having the Put operation 302, the Queued operation 304, a replication request (Repl_Req) 310, a replication complete state 312, a committed state 308, and an acknowledge (ACK) 316. The operational pattern 300 can also include one or more time intervals between pairs of the operations or states. For instance, as shown in FIG. 8, a time interval between the Put operation 302 and the Pending state 306 is 5 milliseconds. Another time interval between the Put operation 302 and the Committed state 308 is 50 milliseconds for a payload with a size up to 100 KB. As described in more detail below with reference to FIG. 10, a violation of the sequences or one or more time intervals of the sequences can be associated with one or more annotations.

Figure 9:
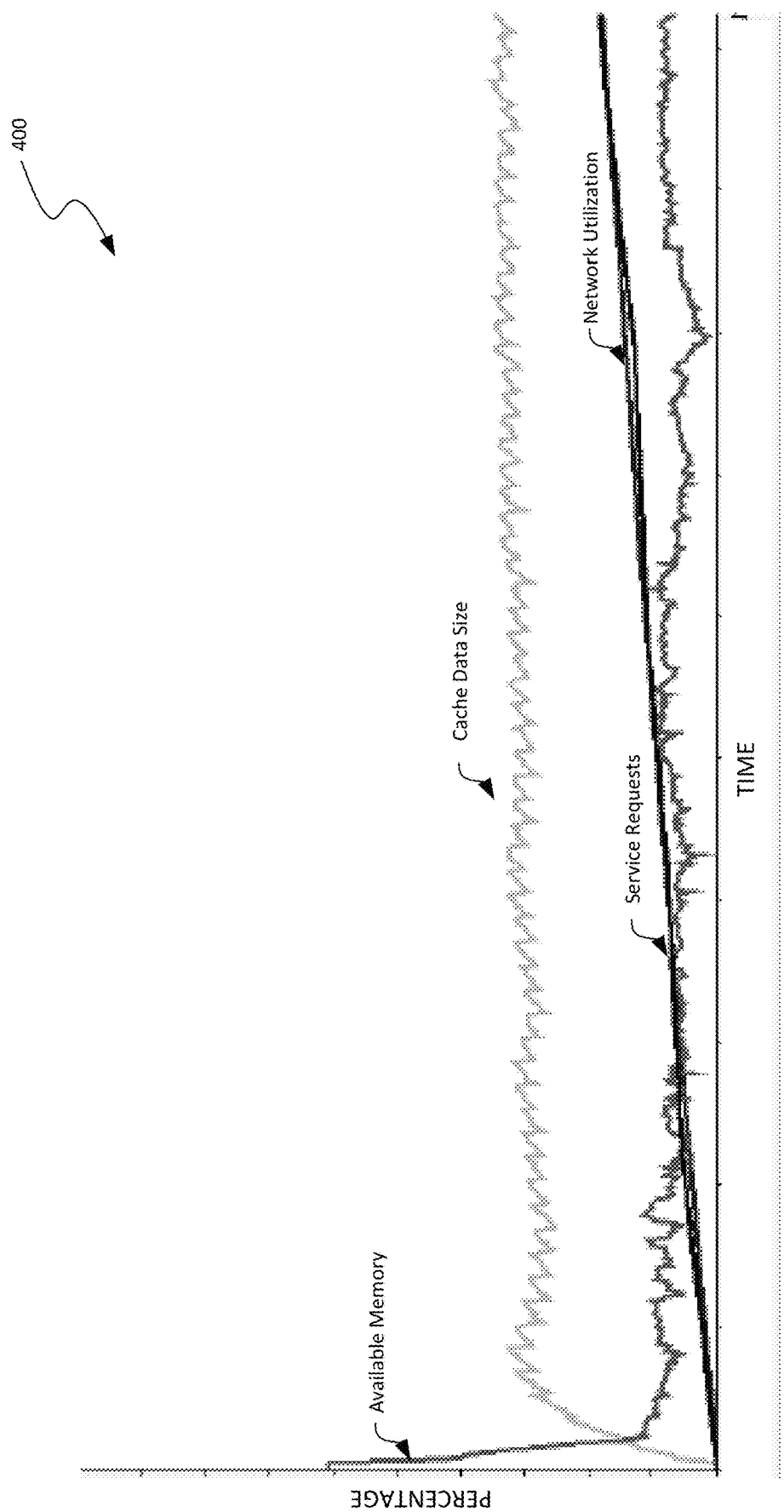
FIG. 9 is a schematic diagram illustrating an example graph of performance metrics in accordance with embodiments of the disclosed technology.

FIG. 9 is a schematic diagram illustrating a graph 400 showing example performance metrics in accordance with embodiments of the disclosed technology. As shown in FIG. 9, the example graph 400 shows a plot of available memory, cache data size, network utilization, and service request metrics over time. As discussed in more detail with reference to FIGS. 2 and 3, two or more of the performance metrics may be correlated with one another. For example, the available memory appears to be inversely correlated with the cache data size. The service request metric appears to be correlated with network utilization.

Figure 10:
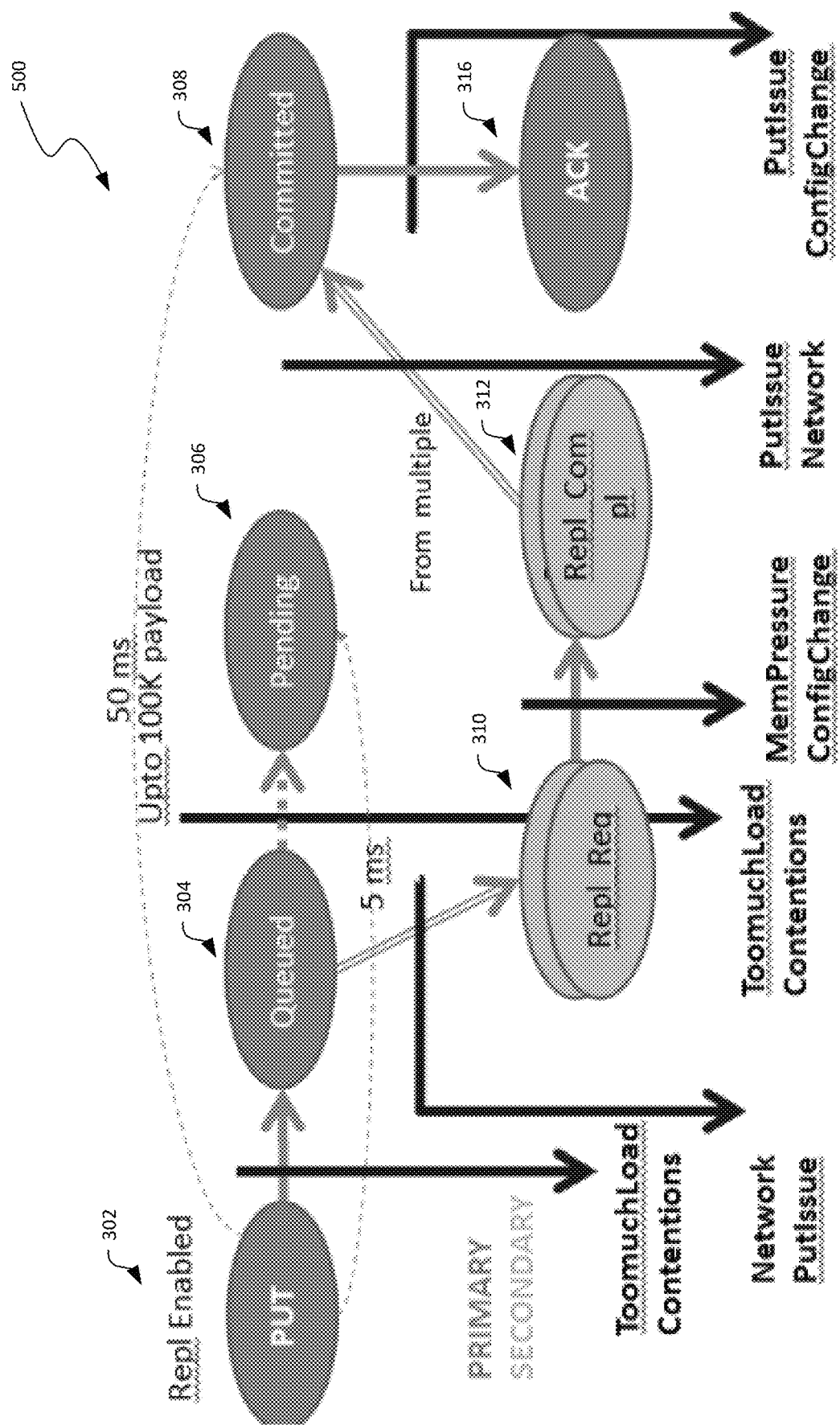
FIG. 10 is a schematic diagram illustrating an example operational pattern with augmented annotations in accordance with embodiments of the disclosed technology.

FIG. 10 is a schematic diagram illustrating an example operational pattern with augmented annotations in accordance with embodiments of the disclosed technology. As shown in FIG. 10, one or more potential reasons, causes, or corrective suggestions can be associated with a violation of the sequences. For example, if a Put operation 302 is not followed by a Queued operation 304, an annotation can be associated with this condition to indicate that possible causes can include too much load contentions in the network. In another example, if a Committed operation 308 is not followed by an acknowledge 316, another annotation can be associated with this condition to indicate that a possible cause is an issue with the Put operation and a corrective suggestion is to modify configuration of the Put operation.

Figure 11A:
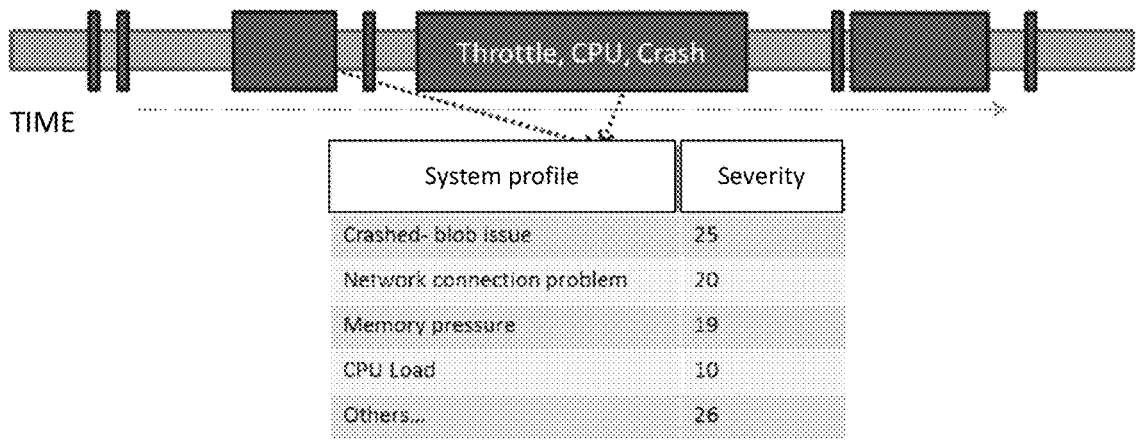
FIGS. 11A-11C are schematic diagrams illustrating an example correlation of operational issues with system health levels in accordance with embodiments of the disclosed technology.
Figure 11B:
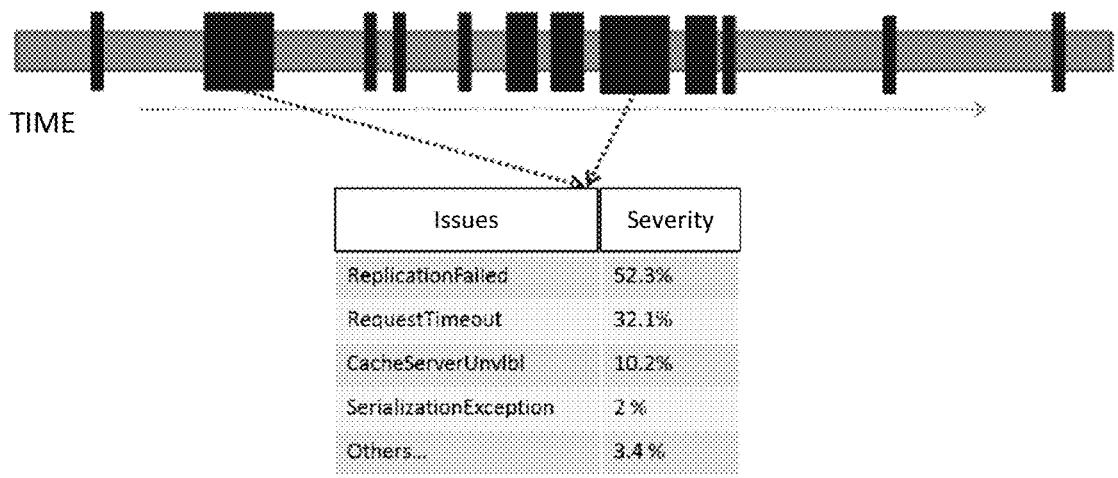
Figure 11C:
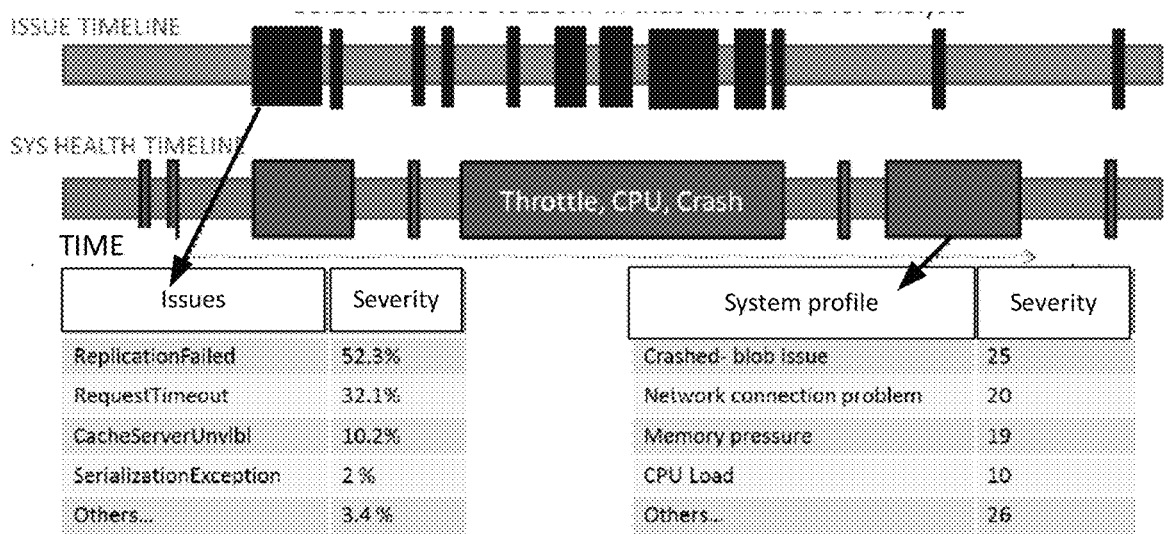

FIGS. 11A-11C are schematic diagrams illustrating an example interface for correlation of operational issues with system health levels in accordance with embodiments of the disclosed technology. As shown in FIG. 11A, system health levels can be aggregated and plotted on a timeline as blocks or other suitable representations. Example health levels shown in FIG. 11A include network throttle and CPU crash. The aggregated system health levels can also be expanded to show details of system profiles and corresponding severity. As shown in FIG. 11B, operational issues such as those experienced by tenants 101 (FIG. 1) can also be aggregated and plotted on a timeline. Similarly, the operational issues can also be expanded to show more detail and corresponding severity. As shown in FIG. 11C, the two timelines in FIGS. 11A and 11B can be aligned, juxtaposed, or otherwise compared to correlate operational issues with system health levels. As described in more detail above with reference to FIGS. 1-4, based on such comparison, possible causes or reasons for the operational issues and corrective suggestion may be provided.

FIG. 12 is a computing device 800 suitable for certain components of the computing framework 100 in FIG. 1. For example, the computing device 800 may be suitable for the client devices 102, the servers 106, or the diagnostic system 108 of FIG. 1. In a very basic configuration 802, computing device 800 typically includes one or more processors 804 and a system memory 806. A memory bus 808 may be used for communicating between processor 804 and system memory 806.

Depending on the desired configuration, the processor 804 may be of any type including but not limited to a microprocessor (μP), a microcontroller (μC), a digital signal processor (DSP), or any combination thereof. The processor 804 may include one more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, the system memory 806 may be of any type including but not limited to volatile memory (such as RAM), non-volatile memory (such as ROM, flash memory, etc.) or any combination thereof. The system memory 806 may include an operating system 820, one or more applications 822, and program data 824. The program data 824 may include, for example, the operational profiles 122s. This described basic configuration 802 is illustrated in FIG. 8 by those components within the inner dashed line.

The computing device 800 may have additional features or functionality, and additional interfaces to facilitate communications between basic configuration 802 and any other devices and interfaces. For example, a bus/interface controller 830 may be used to facilitate communications between the basic configuration 802 and one or more data storage devices 832 via a storage interface bus 834. The data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 806, removable storage devices 836, and non-removable storage devices 838 are examples of computer readable storage media. Computer readable storage media include storage hardware or device(s), examples of which include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which may be used to store the desired information and which may be accessed by computing device 800. Any such computer readable storage media may be a part of computing device 800. The term "computer readable storage medium" excludes propagated signals and communication media.

The computing device 800 may also include an interface bus 840 for facilitating communication from various interface devices (e.g., output devices 842, peripheral interfaces 844, and communication devices 846) to the basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 800 may also be implemented as a personal computer including both laptop computer and non-laptop computer configurations.

Specific embodiments of the technology have been described above for purposes of illustration. However, various modifications may be made without deviating from the foregoing disclosure. In addition, many of the elements of one embodiment may be combined with other embodiments in addition to or in lieu of the elements of the other embodiments. Accordingly, the technology is not limited except as by the appended claims.

I claim:

1. A diagnostic system for diagnosing performance of a monitored computing system, comprising:
 a processor; and
 a memory operatively coupled to the processor, the memory storing computer-executable instructions executable by the processor to cause the remote diagnostic system to:
  receive operational data from an analyzed computing system, the operational data representing one or more of operations, events, or system states related to the computing system;
  identify an operational pattern based on the operational data, the operational pattern including a temporal sequence of the operations, events, or system states related to the analyzed computing system; and generate data representing an operational profile of the computing system by associating an annotation with the identified operational pattern, the annotation identifying a reason, a cause, or a corrective suggestion corresponding to a violation of the operational pattern, wherein the operational profile includes the identified operational pattern and the associated annotation, and wherein the operational profile allows the annotation to be provided to identify a reason, a cause, or a corrective suggestion corresponding to a violation of the temporal sequence in the associated operational pattern.

2. The diagnostic system of claim 1 wherein the received operational data from the analyzed computing system includes operational data from the analyzed computing system operating under normal conditions.

3. The diagnostic system of claim 1 wherein the received operational data from the analyzed computing system includes event logs from the analyzed computing system operating under normal conditions.

4. The diagnostic system of claim 1 wherein:
the received operational data from the analyzed computing system includes event logs from the analyzed computing system operating under normal conditions; and
the memory comprises additional instructions executable by the processor to cause the diagnostic system to:
parse the event logs; and
identify a temporal sequence of events based on the parsed event logs.

5. The diagnostic system of claim 1, wherein:
the received operational data from the analyzed computing system includes event logs from the analyzed computing system operating under normal conditions; and
the memory comprises additional instructions executable by the processor to cause the diagnostic system to:
parse the event logs;
identify a temporal sequence of events based on the parsed event logs; and
identify a time interval between a pair of the events of the temporal sequence.

6. The diagnostic system of claim 1, wherein:
the received operational data from the analyzed computing system includes event logs from the analyzed computing system operating under normal conditions; and
the memory comprises additional instructions executable by the processor to cause the diagnostic system to:
parse the event logs;
identify a temporal sequence of events based on the parsed event logs;
identify a time interval between a pair of the events of the temporal sequence; and
associate the received annotation with a condition for which the time interval between the pair of the events of the temporal sequence is exceeded.

7. The diagnostic system of claim 1 wherein:
the annotation is a first annotation; and
the memory comprises additional instructions executable by the processor to cause the diagnostic system to:
identify a correlation of performance metrics of the computing system, the performance metrics individually including an operating parameter corresponding to a performance level of the analyzed computing system; and
receive and associate a second annotation with the correlation of performance metrics, the second annotation identifying a reason, a cause, or a corrective suggestion corresponding to a violation of the correlation of the performance metrics.

8. A method of diagnosing computing system performance, comprising:
receiving operational data from an analyzed computing system;
identifying an operational pattern based on the operational data from the analyzed computing system, the operational pattern including a temporal sequence of operations, events, or system states related to the analyzed computing system;
generating data representing an operational profile of the computing system by associating an annotation with the identified operational pattern, the annotation identifying a reason, a cause, or a corrective suggestion corresponding to a violation of the temporal sequence; and
providing, to a diagnostic computing system, the generated operational profile for diagnosing performance of the analyzed computing system based on additional operational data from the computing system, wherein the provided operational profile allows the diagnostic computing system to provide the annotation to identify a reason, a cause, or a corrective suggestion corresponding to a violation of the temporal sequence in the associated operational pattern.

9. The method of claim 8 wherein receiving the operational data from the analyzed computing system includes receiving operational data from the analyzed computing system operating under normal conditions.

10. The method of claim 8 wherein receiving the operational data from the analyzed computing system includes receiving event logs from the analyzed computing system operating under normal conditions.

11. The method of claim 8 wherein:
receiving the operational data from the analyzed computing system includes receiving event logs from the analyzed computing system operating under normal conditions; and
identifying the operational pattern includes:
parsing the event logs based on keywords; and
identifying a temporal sequence of events based on the parsed event logs.

12. The method of claim 8 wherein:
receiving the operational data from the analyzed computing system includes receiving event logs from the analyzed computing system operating under normal conditions; and
identifying the operational pattern includes:
parsing the event logs based on keywords;
identifying a temporal sequence of events based on the parsed event logs; and
identifying a time interval between a pair of the events of the temporal sequence.

13. The method of claim 8 wherein:
receiving the operational data from the analyzed computing system includes receiving event logs from the analyzed computing system operating under normal conditions;

identifying the operational pattern includes:
    parsing the event logs based on keywords;
    identifying a temporal sequence of events based on the parsed event logs; and
    identifying a time interval between a pair of the events of the temporal sequence; and
associating the received annotation includes associating the received annotation with a condition for which the time interval between the pair of the events of the temporal sequence is exceeded.

14. The method of claim 8 wherein:
the annotation is a first annotation; and
the method further includes:
    identifying a correlation of performance metrics of the analyzed computing system, the performance metrics individually including an operating parameter corresponding to a performance level of the computing system; and
    receiving a second annotation and associating the second annotation with the correlation of performance metrics, the second annotation identifying a reason, a cause, or a corrective suggestion corresponding to a violation of the correlation of the performance metrics.

15. The method of claim 8, further comprising:
receiving additional operational data from the analyzed computing system;
identifying another operational pattern based on the additional operational data; and
updating the association of the received annotation with the identified another operational pattern.

16. A method of diagnosing computing system performance, comprising:
    receiving operational data from a computing system;
    identifying an operational pattern based on the received operational data, the operational pattern including a temporal sequence of operations, events, or system states of the computing system;
    determining whether the identified operational pattern violates an operational profile by comparing the identified operational pattern with a reference operational pattern of the operational profile; and
    in response to determining that the identified operational pattern violates the reference operational pattern of the operational profile, outputting, via a device remote from the computing system, a reason, cause, or corrective suggestion contained in an annotation associated with the reference operational sequence in the operational profile for diagnosing performance of the computing system.

17. The method of claim 16 wherein:
receiving the operational data includes receiving event logs from the computing system; and
identifying the operational pattern includes:
    parsing the event logs based on keywords; and
    identifying a temporal sequence of events based on the parsed event logs.

18. The method of claim 16 wherein:
receiving the operational data includes receiving event logs from the computing system operating; and
identifying the operational pattern includes:
    parsing the event logs based on keywords;
    identifying a temporal sequence of events based on the parsed event logs; and
    identifying a time interval between a pair of the events of the temporal sequence.

19. The method of claim 16 wherein:
the annotation is a first annotation; and
the method further includes:
    identifying a correlation of performance metrics of the computing system, the performance metrics individually including an operating parameter corresponding to a performance level of the computing system;
    determine whether the identified correlation of performance metrics violates a reference correlation of performance metrics associated with a second annotation identifying a reason, a cause, or a corrective suggestion corresponding to a violation of the correlation of performance metrics; and
    in response to determining that the identified correlation of performance metrics violates the reference correlation of performance metrics, outputting the reason, cause, or corrective suggestion contained in the second annotation for diagnosing performance of the computing system.

20. The method of claim 16, further comprising:
receiving an operational issue of the computing system from a tenant of the computing system;
determining if a timeline of the operational issue correlates with a timeline of the violation of the operational pattern; and
in response to determining that the timeline of the operational issue correlates with the timeline of the violation of the operational pattern, outputting the reason, cause, or corrective suggestion contained in the annotation as related to the received operational issue.

* * * * *